United States Patent
Moeker et al.

(10) Patent No.: US 8,474,873 B2
(45) Date of Patent: Jul. 2, 2013

(54) SEAT BELT SYSTEM IN MOTOR VEHICLES

(75) Inventors: Carsten Moeker, Ruehen (DE); Stefan Grutzeck, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/129,367

(22) PCT Filed: Sep. 12, 2009

(86) PCT No.: PCT/EP2009/006623
§ 371 (c)(1),
(2), (4) Date: Aug. 15, 2011

(87) PCT Pub. No.: WO2010/054713
PCT Pub. Date: May 20, 2010

(65) Prior Publication Data
US 2011/0291395 A1  Dec. 1, 2011

(30) Foreign Application Priority Data
Nov. 13, 2008 (DE) .......... 10 2008 057 124

(51) Int. Cl.
*B60R 22/195* (2006.01)
*B60R 22/22* (2006.01)

(52) U.S. Cl.
USPC ......... 280/806; 280/801.1; 280/808; 297/480

(58) Field of Classification Search
USPC ............ 280/801.1, 806, 808; 297/480
IPC .................................. B60R 22/22,22/195
See application file for complete search history.

(56) References Cited

U.S. PATENT DOCUMENTS

| 4,783,098 | A  | * | 11/1988 | Yokouchi ............ 280/801.1 |
| 5,482,327 | A  |   | 1/1996  | Schmid |
| 5,588,677 | A  | * | 12/1996 | Kopetzky et al. ...... 280/806 |
| 6,199,954 | B1 | * | 3/2001  | Holzapfel .......... 297/479 |
| 6,382,674 | B1 |   | 5/2002  | Specht et al. |
| 6,527,299 | B2 |   | 3/2003  | Specht et al. |
| 7,364,201 | B2 | * | 4/2008  | Lutz et al. ........... 280/806 |
| 2002/0105181 | A1 | * | 8/2002 | Specht et al. .......... 280/806 |
| 2006/0076765 | A1 | * | 4/2006 | Bell et al. ........... 280/806 |
| 2011/0241328 | A1 | * | 10/2011 | Miyajima et al. ...... 280/808 |
| 2012/0049501 | A1 | * | 3/2012 | Fujii et al. .......... 280/806 |
| 2012/0146318 | A1 | * | 6/2012 | Kim ................. 280/806 |

FOREIGN PATENT DOCUMENTS

| DE | 71 34 965   | 12/1971 |
| DE | 199 60 848  | 6/2001 |
| DE | 101 05 500  | 8/2002 |

(Continued)

OTHER PUBLICATIONS

International Search Report, issued in corresponding International Application No. PCT/EP2009/006623.

(Continued)

*Primary Examiner* — Ruth Ilan
(74) *Attorney, Agent, or Firm* — Kenyon & Kenyon LLP

(57) ABSTRACT

A seat belt system in motor vehicles includes a seat belt disposed at a front seat and a shoulder-belt portion and a lap-belt portion, which at its outer anchorage point, is retained in the area of a door sill of the motor vehicle on a belt tensioner that is connected to the lap-belt portion via a connecting device. The connecting device is disposed out of view below a door-sill molding.

10 Claims, 6 Drawing Sheets

| FOREIGN PATENT DOCUMENTS | | |
|---|---|---|
| EP | 0 640 516 | 3/1995 |
| FR | 2 862 033 | 5/2005 |
| GB | 1 407 954 | 10/1975 |
| JP | 2006-199197 | 8/2006 |
| JP | 2006-199198 | 8/2006 |

OTHER PUBLICATIONS

Written Opinion, issued in corresponding International Application No. PCT/EP2009/006623.

* cited by examiner

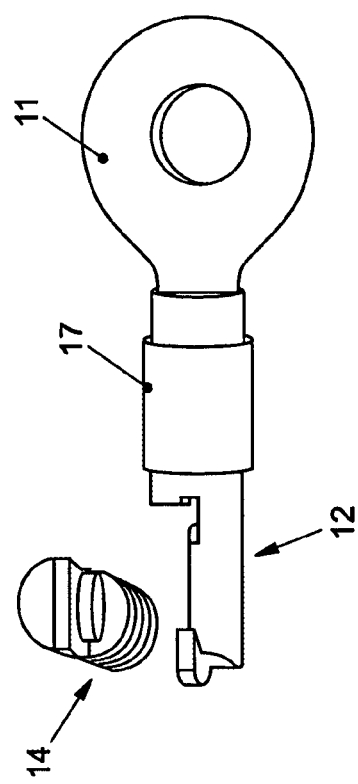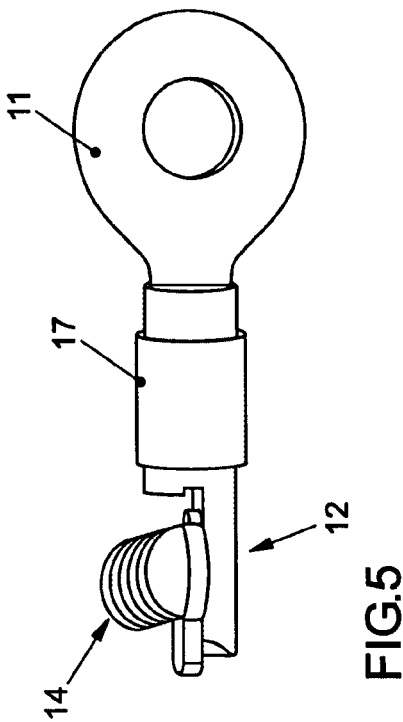

SEAT BELT SYSTEM IN MOTOR VEHICLES

FIELD OF THE INVENTION

The present invention relates to a seat belt system in motor vehicles.

BACKGROUND INFORMATION

Certain restraint systems at front seats in motor vehicles having a three-point seat belt which provide, inter alia, belt tensioners not only at the shoulder-belt portion, but also at the outer anchorage point of the lap-belt portion, are conventional.

Such a double tightening (shoulder tightening and anchor-fitting tightening) is being considered increasingly by automobile manufacturers because of better biomechanical passenger values (chest acceleration, chest deflection) as well as the avoidance of knee contact with the control panel in all vehicle sizes. In this case, the conventional anchor fitting is replaced by a pyrotechnically ignitable anchor-fitting tightener which, in the event of a crash, pulls belt slack out of the lap-belt portion and reduces the pelvis forward travel, thus having a positive influence on the occupant kinematics. The shoulder tightening takes place as usual, however, the shoulder tightener and anchor-fitting tightener should be activated in time-staggered fashion.

The following anchor-fitting tightener concept is known at present, according to which, in principle, a modified buckle retractor is used. The coupling location between the lap belt and the anchor-fitting tightener is situated visibly in the vehicle. The tightener unit is positioned below the door-sill molding.

SUMMARY

Example embodiments of the present invention provide a seat belt system which is operationally reliable.

According to example embodiments of the present invention, the coupling location is disposed so that it is concealed below the door-sill molding. The pyrotechnically activatable tensioner of the lap belt may be secured to the lateral door sill of the motor-vehicle body, and at the coupling location, may be connected to the lap belt via a connecting device. The belt tensioner, together with the connecting device, is therefore positioned behind a covering provided on the door sill. The lap belt may be coupled via a guide slot in the covering and via a rerouting part, to the movable tensioner part of the belt tensioner.

With the coupling location concealed, the look and feel of the passenger compartment is not disturbed by the coupling/joining location. As in the case of the conventional belt system, the customer sees only the belt in the passenger compartment. A further advantage is that access to the seat-back adjuster is not restricted, for example, for hand clearance in order to adjust the seat-back inclination. In this design, the belt coming out of the passenger compartment is guided through the door-sill molding and then, with the aid of a rerouter, is guided in the direction of the coupling location and tightener unit.

However, the joining together of such an anchor-fitting tightener with the lap belt underneath the door-sill molding is associated with high expenditure for assembly. Because the coupling location is disposed behind the door-sill molding in a manner that it is out of view, a simple, reliable assembly may prove to be difficult.

For easy joining of the anchor-fitting tightener with the lap belt, the connecting device may be a bayonet connection having one coupling part on the belt side and one coupling part on the belt-tensioner side. Such a bayonet connection may be provided extremely compactly in view of the limited space below the door-sill molding. In so doing, the coupling part on the belt side may be dimensioned such that it is able to be passed through the guide slot in the covering during assembly. The lap-belt portion together with the one coupling part may thereby be passed through the guide slot in the covering and through the rerouting part, and coupled to the stationary belt tensioner via the bayonet connection in an easy, convenient-to-assemble manner.

The bayonet connection may also be lockable in the operating position by a locking element. Thus, with modest extra structural expense, it is ensured that the connection between the lap-belt portion and the movable tensioner part of the belt tensioner is reliably maintained, that is, cannot release unintentionally during daily operation of the motor vehicle.

Moreover, in a manner advantageous both structurally and from the standpoint of production engineering, the bayonet connection may be formed by two pin-shaped coupling parts, provided on the tensioner part and on the end of the lap belt, that are joinable with form locking in a position angled by 90° relative to each other, for example, and are lockable in the extended position. In addition, in the extended position, the tension forces exerted by the activated belt tensioner are able to be transmitted easily in case of a crash.

Moreover, the locking element may be a sleeve, axially displaceable on one coupling part, which in the extended position of the coupling parts, is able to be slid onto the second coupling part. Thus, a particularly reliable assembly is achieved, since the specified sleeve is only able to be slid onto the second coupling part when the two coupling parts of the bayonet connection are properly joined and are adjusted into the extended position.

The locking sleeve ensures in an easy manner that the bayonet catch is properly locked. The worker is able to recognize immediately if the catch is not properly locked. A spurious locking is thus ruled out. If the locking sleeve cannot be pulled over the catch, it is a spurious locking.

Moreover, a construction that reliably transfers tension forces and is favorable from the standpoint of assembly provides for disposing on the coupling parts of the connecting device, a centric pin aligned transversely with respect to the longitudinal axis, and diametrically-opposite, circle-segment-shaped locking tongues, which in the extended position, interact with form locking with a corresponding bearing bore and with corresponding slot-shaped guide grooves.

In this context, the locking tongues integrally molded on the coupling parts may also be offset in stepped fashion with respect to the plane of the flattenings, thereby attaining an additional anchoring of the bayonet connection in the load direction and increased transferability of tension forces via the coupling parts.

In the case of a four-door motor vehicle, the belt tensioner may be disposed at the side of the corresponding front seat and in front of the rerouting part, on the door sill, while in the case of a two-door motor vehicle, the belt tensioner may be located behind the corresponding front seat and behind the rerouting part, on the door sill. Consequently, it is possible to increasingly take into account the different installation conditions for the best placement of the belt tensioner on one hand, and for attaining a favorable lap-belt path while allowing for a free space for entering the vehicle rear passenger compartment in the case of two-door motor vehicles.

An exemplary embodiment of the present invention is described more precisely with further particulars in the following.

BRIEF DESCRIPTION OF THE DRAWINGS

FIGS. 4 to 6 illustrate the bayonet connection according to FIG. 3 in the assembly sequence of "join", "lock" and "secure" with the aid of an axially displaceable sleeve".

DETAILED DESCRIPTION

Figure 1:
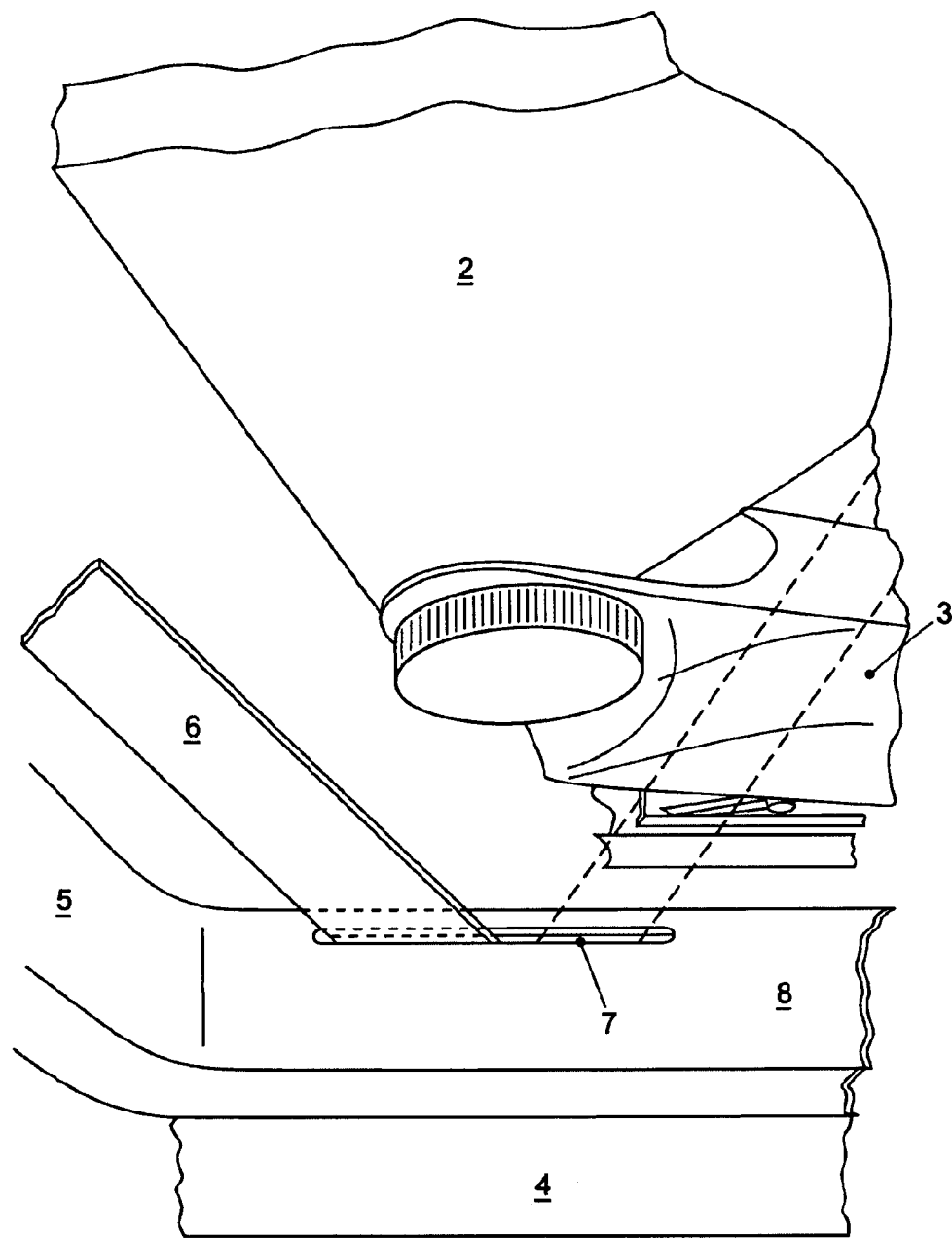
FIG. 1 is a partial view of a front seat of a four-door passenger motor vehicle in the entry area, with only a partially apparent lap-belt portion of a three-point seat belt, which is connected via a guide slot in a covering of the lateral door sill and via a rerouting part, to a belt tensioner secured to the door sill.

FIG. 1 shows a section of the entry area of a four-door motor vehicle with open front doors (not shown) having an only partially visible front seat 1, which has a backrest 2 and a seat part 3.

Alternatively, the anchor-fitting tightener system shown is also usable in a two-door motor vehicle. However, the belt path in the storage state should not obstruct entrance into the rear passenger compartment, in order to minimize the danger of stumbling.

The only partially apparent entry area is bounded downwards by a horizontally extending, lateral door sill 4 and rearwards by an approximately vertical B-pillar 5 of the body of the motor vehicle.

Each front seat 1 of the motor vehicle has a three-point seat belt system formed, e.g., in a conventional manner of a lap-belt portion 6 and a shoulder-belt portion (not visible).

The shoulder belt portion is anchored to B-pillar 5 via a first belt tensioner (not shown) approximately at the head height of a passenger sitting in front seat 1.

In the buckled-up state (dashed lines), lap-belt portion 6 extends from the belt buckle at the side of front seat 1 facing away from door sill 4, across the pelvic region of an occupant to the outer anchorage point at door sill 4, belt portion 6 being passed through a guide slot 7 of a covering 8 made of plastic.

Figure 2:
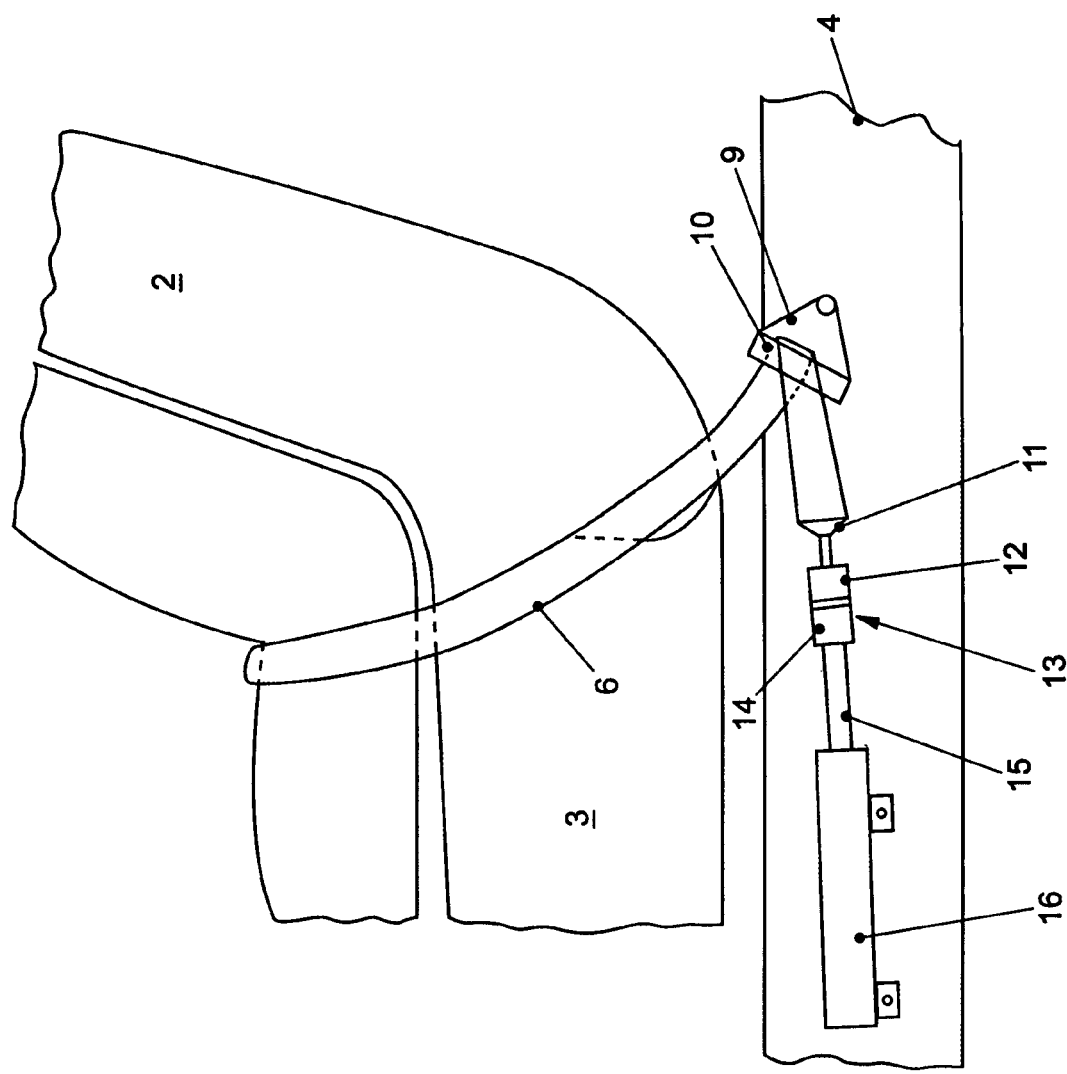
FIG. 2 illustrates the configuration according to FIG. 1, however without covering of the door sill, with a clearly visible belt tensioner whose movable tensioner part is connected via a bayonet connection to the lap-belt portion.

FIG. 2 shows the further course of lap-belt portion 6, which below guide slot 7, is rerouted forwards via a rerouting part 9 having a corresponding pass-through slot 10, and is secured to an eye 11 of a first coupling part 12. Rerouting part 9 is hinged on door sill 4 in a manner allowing it to swivel. As an alternative to the example embodiment shown, rerouting part 9 may also be implemented as a non-swiveling, fixed rerouting bracket.

Coupling part 12 is fixedly joined via a bayonet connection 13, yet to be described, to a second coupling part 14 that is fixedly joined with the aid of a cable pull 15 to the movable tensioner part (e.g., an axially displaceable piston) of a belt tensioner 16.

Belt tensioner 16, of conventional construction, is secured to door sill 4 by screws, not further shown, and is activated pyrotechnically in the event of a crash of the motor vehicle, upon which it tightens or tensions lap-belt portion 6 by the tensioner part, cable pull 15 and coupling parts 14, 12.

Figure 3:
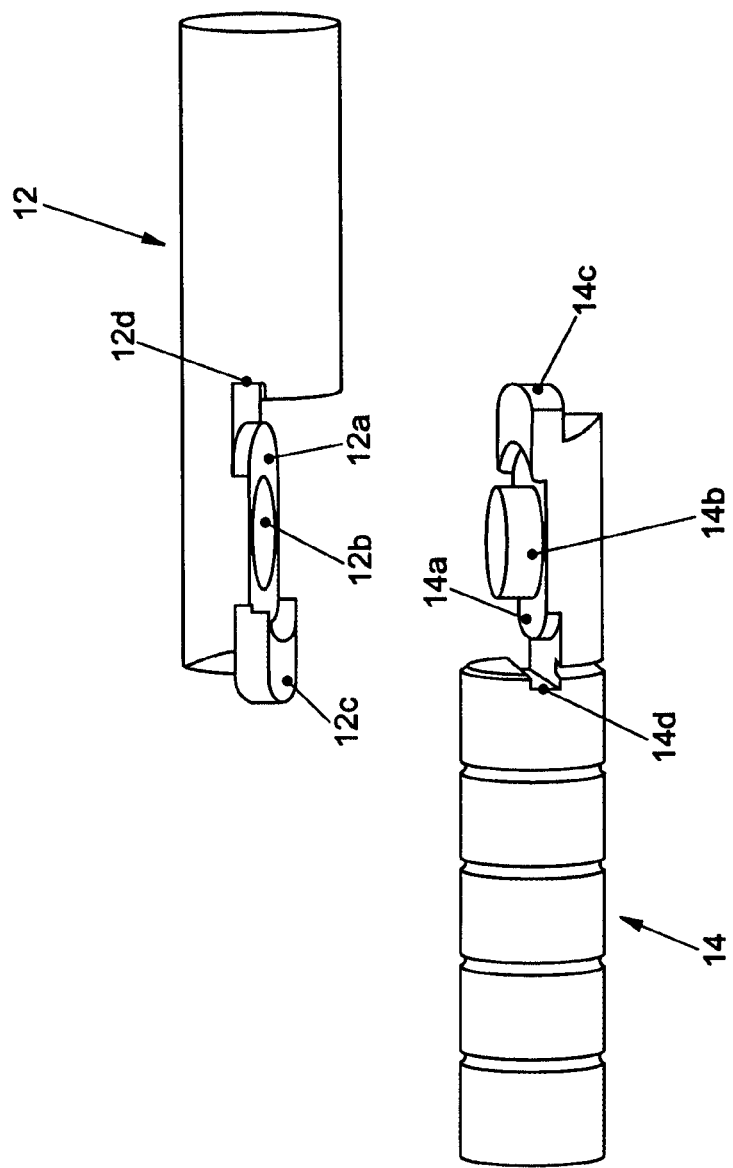
FIG. 3 illustrates the two coupling parts of the bayonet connection in the released state.

Coupling parts 12 and 14 (see FIG. 3) are pin-shaped and have two flattenings 12a, 14a facing each other, which are implemented as follows to form a bayonet connection 13.

Flattening 14a has a protruding, centric pin 14b, a segment-shaped locking tongue 14c projecting radially with respect to it, and a diametrically opposite guide groove 14d.

On the other hand, flattening 12a of coupling part 12 is provided with a centric bearing bore 12b, a radially projecting, segment-shaped locking tongue 12c and likewise a diametrically opposite guide groove 12d.

Figure 7:
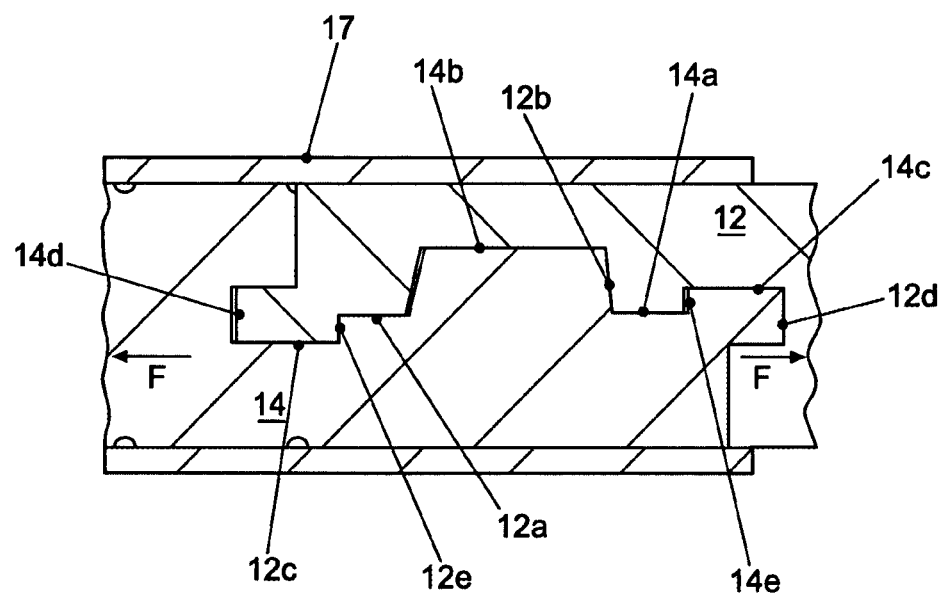
FIG. 7 is a longitudinal cross-sectional view through the bayonet connection according to line VII-VII of FIG. 6.

In addition, a sleeve 17 is slipped onto coupling part 12 with slight friction locking; in the pushed-back state, the sleeve releases flattening 12a, and in the secured state, the sleeve covers flattening 12a of coupling part 12 and flattening 14a of coupling part 14 (see especially FIG. 7).

Figure 6:
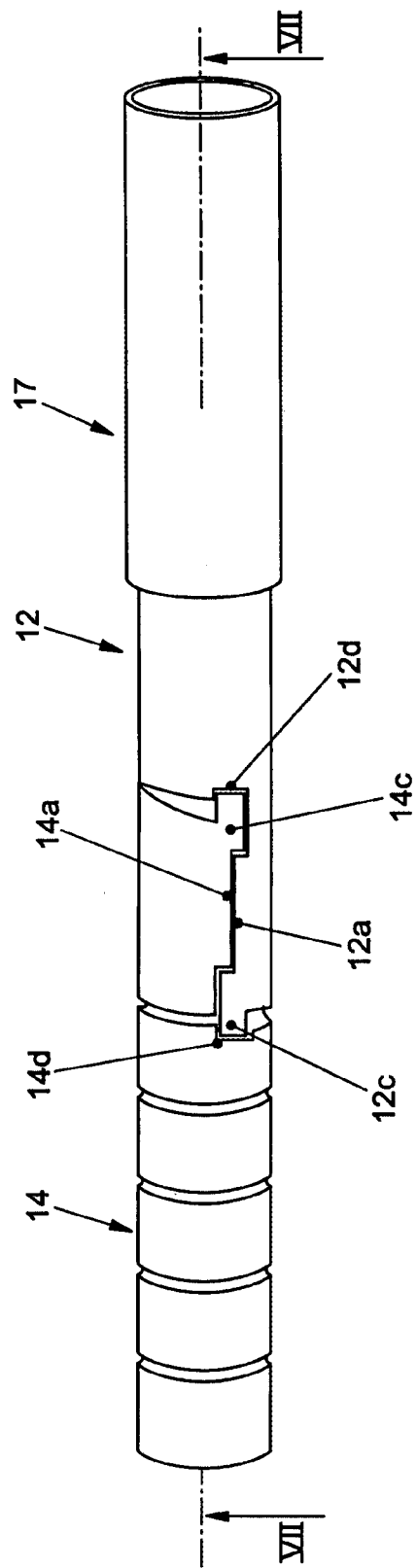

FIG. 4 through 6 show the assembly sequence for producing bayonet connection 13 of the two coupling parts 12, 14.

After passing lap-belt portion 6 together with coupling part 12 through guide slot 7 in covering 8 and through rerouting part 9, it is joined to coupling part 14.

To that end, coupling parts 12, 14 are angled by 90° relative to each other (FIG. 4) and then joined in the direction of the marked-in arrow, in the course of which, pin 14b enters into bearing bore 12b (FIG. 5).

The two coupling parts 12, 14 are subsequently swiveled relative to each other according to the marked-in arrow in FIG. 5 and shifted into the extended position (FIG. 6), in doing which, locking tongues 12c and 14c move into guide grooves 12d, 14d, respectively, and produce bayonet connection 13.

In the extended position of coupling parts 12, 14, sleeve 17 is slid over flattenings 12a, 14a of coupling parts 12, 14, and thus locks bayonet connection 13. Due to the precisely-fitting enclosure of coupling parts 12, 14 by sleeve 17, locking is only possible if coupling parts 12, 14 are properly joined, so that an incorrect assembly is reliably ruled out.

The tension forces occurring upon activation of belt tensioner 16 are transferred from the one coupling part 14 via bearing pin 14b and locking tongues 14c, 12c to the other coupling part 12, the stressed flank sections or peripheral sections being indicated in FIG. 7 by thickened lines. In addition, as evident, locking tongues 12c, 14c are offset in the form of steps out of the plane of flattenings 12a 14a (at 12e, 14e).

As shown particularly clearly in FIG. 2, belt tensioner 16 is disposed in front of rerouting part 9 and to the side of front seat 1, on door sill 4.

In the case of a two-door motor vehicle having a suitably larger entry area rearwards, which facilitates the entry of a passenger into the rear passenger compartment of the motor vehicle, belt tensioner 16 may expediently be positioned behind rerouting part 9 and may tension lap-belt portion 6 rearwards in the event of a crash.

LIST OF REFERENCE CHARACTERS 1 front seat
2 backrest
3 seat part
4 door sill
5 B-pillar
6 lap-belt portion
7 guide slot
8 covering or molding
9 rerouting part 10 pass-through slot
11 eye
12 coupling part
12*a* flattening
12*b* bearing bore
12*c* locking tongue
12*d* guide groove
12*e* stepping
13 bayonet connection
14 coupling part
14*a* flattening
14*b* bearing pin
14*c* locking tongue
14*d* guide groove
14*e* stepping
15 traction cable
16 belt tensioner
17 sleeve

What is claimed is:

1. A seat belt system for a motor vehicle, comprising:
   a seat belt arranged at a front seat of the vehicle and including a shoulder-belt portion and a lap-belt portion retained, at an outer anchorage point, in an area of a door sill of the motor vehicle on a belt tensioner that is connected via a connecting device to the lap-belt portion;
   wherein the connecting device is arranged out of view below a door-sill molding; and
   wherein the connecting device includes a bayonet connection having a coupling part on a belt side and a coupling part on a belt-tensioner side.

2. The seat belt system according to claim 1, further comprising a rerouting part arranged out of view below the door-sill molding, and starting from the connecting device, the lap-belt portion extends out of the door-sill molding via the rerouting part through a guide slot.

3. The seat belt system according to claim 2, wherein the motor vehicle is a four-door motor vehicle, the belt tensioner being positioned to a side of a corresponding front seat and in front of the rerouting part, on the door sill.

4. The seat belt system according to claim 2, the motor vehicle is a two-door motor vehicle, the belt tensioner being positioned behind a corresponding front seat and behind the rerouting part, on the door sill.

5. The seat belt system according to claim 1, wherein the coupling part on the belt side is dimensioned to be guidable, upon assembly with the coupling part on the belt-tensioner side, through a guide slot in the door-sill molding.

6. The seat belt system according to claim 1, wherein the connecting device is lockable in an operating position by a locking element.

7. The seat belt system according to claim 1, wherein pin-shaped coupling parts are provided on the belt tensioner and at an end of the lap belt, are joinable with form locking in an angled position relative to each other, and are lockable in an extended position.

8. The seat belt system according to claim 7, wherein a locking element includes a sleeve, axially displaceable on one coupling part, which in the extended position of the coupling parts, slidable onto the other coupling part.

9. The seat belt system according to claim 1, wherein disposed on the coupling parts of the bayonet connection are a centric pin aligned transversely with respect to a longitudinal axis, and diametrically-opposite, circle-segment-shaped locking tongues, which in an extended position, interact with form locking with a corresponding bearing bore and with corresponding slot-shaped guide grooves.

10. The seat belt system according to claim 9, wherein the locking tongues, integrally molded on the coupling parts, are offset in stepped fashion with respect to a plane of flattenings.

* * * * *

UNITED STATES PATENT AND TRADEMARK OFFICE
CERTIFICATE OF CORRECTION

PATENT NO. : 8,474,873 B2
APPLICATION NO. : 13/129367
DATED : July 2, 2013
INVENTOR(S) : Moeker et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 54 days.

Signed and Sealed this
Eighth Day of September, 2015

Michelle K. Lee
*Director of the United States Patent and Trademark Office*